Figure 1:
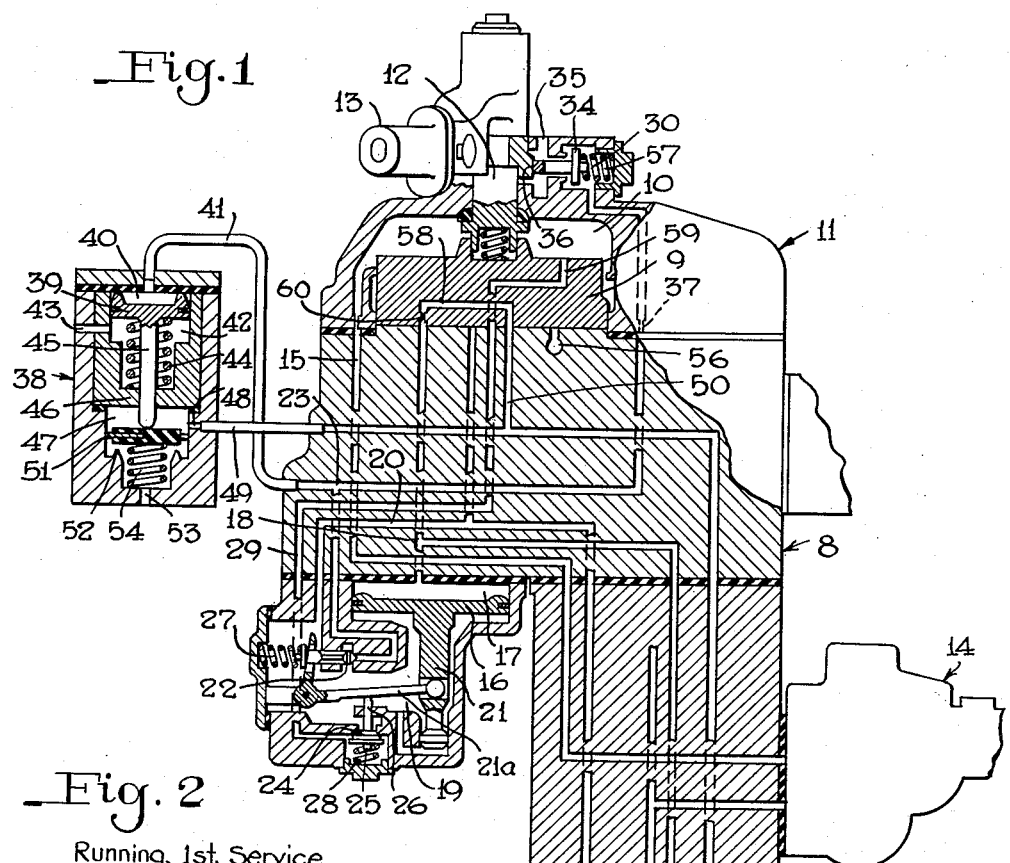

Dec. 14, 1954 W. B. KIRK 2,697,013
FLUID PRESSURE BRAKE APPARATUS
Filed March 8, 1951

INVENTOR.
Walter B. Kirk
BY
Frank E. Miller
ATTORNEY

United States Patent Office 2,697,013
Patented Dec. 14, 1954

2,697,013

FLUID PRESSURE BRAKE APPARATUS

Walter B. Kirk, East McKeesport, Pa., assignor to Westinghouse Air Brake Company, a corporation of Pennsylvania Application March 8, 1951, Serial No. 214,500

5 Claims. (Cl. 303—60)

This invention relates to fluid pressure brakes and more particularly to the type for use on railway locomotives.

In controlling the brakes on a train during descent of a grade, it is desirable to be able to effect a chosen reduction in pressure of fluid in the usual brake pipe to thereby effect a chosen degree of brake application on the train and then to prevent leakage of fluid under pressure from increasing the degree of brake application above said chosen degree and this may be accomplished by supplying fluid under pressure to the brake pipe to maintain the pressure therein against leakage and substantially constant at the reduced pressure, this operation being called flat maintaining.

If a light slack gathering brake application is initiated before a train is fully charged, under which condition there will be a greater differential between the pressures at the head and rear ends of the train, known as false gradient, than exists after completion of a charging operation, the brake application will be transmitted through the train and brake pipe pressure will be locally reduced from car to car through the train by quick service operation of the usual AB valves on the cars of the train. If flat maintaining is effective under such a condition, the fluid under pressure supplied to the brake pipe will then increase the pressure therein back from the locomotive to such an extent that, except for a few cars adjacent the locomotive, the brakes will be released on the train which is undesirable. In order to prevent release of brakes under such a condition, so-called fading maintaining has been employed, that is, after having effected a light reduction in pressure in the usual equalizing reservoir at a service rate to cause the light slack gathering application of brakes, the pressure of fluid in the equalizing reservoir is permitted to continue reducing at a chosen, but much slower rate so as to thereby limit the fluid under pressure supplied to the brake pipe for maintaining purposes to an amount which will hold brake pipe pressure equal to the reducing pressure in the equalizing reservoir, but will prevent the pressure in the brake pipe increasing back in the train to such an extent as to cause a release of brakes such as above mentioned.

Flat maintaining is desirable under all conditions except that just described, and one object of the invention is the provision of improved means which will automatically provide flat maintaining except when an application of brakes is initiated at the time a false gradient exists in the brake pipe and then to provide fading maintaining only until the false gradient disappears due to pressure in the brake pipe substantially equalizing throughout the train.

When a false gradient is present in the brake pipe and an engineer's brake valve device is moved out of the usual charging position to a service position for reducing the pressure of fluid in the usual equalizing reservoir, it is known that by flow toward the rear of the train the pressure of fluid in the brake pipe at the head end of the train will reduce faster than that in the equalizing reservoir and this will continue until the pressures in the brake pipe at the front and rear ends of the train substantially equalize. During this process of equalizing, the usual equalizing piston controlled by opposing pressures in the equalizing reservoir and brake pipe will hold the brake pipe discharge valve closed. However, when substantial equalization of brake pipe pressure occurs through the train then the brake pipe discharge valve will be opened in response to reducing pressure in the equalizing reservoir to reduce brake pipe pressure according to the reduction in pressure in the equalizing reservoir. Undesired release of brakes, such as above described, will occur if flat maintaining is employed during the equalizing process above mentioned, but will be prevented by fading maintaining. After the substantial equalization occurs, however, and the brake pipe dicharge valve opens such undesired release of brakes will not occur and flat maintaining may be employed.

According to the above object, I take advantage of the brake pipe discharge valve which automatically opens upon dissipation of a false gradient to cut off fading maintaining as soon, it will be noted, as it is no longer necessary and to then provide flat maintaining as desired.

Other objects and advantages will become apparent from the following more detailed descripiton of the invention.

Figure 2:
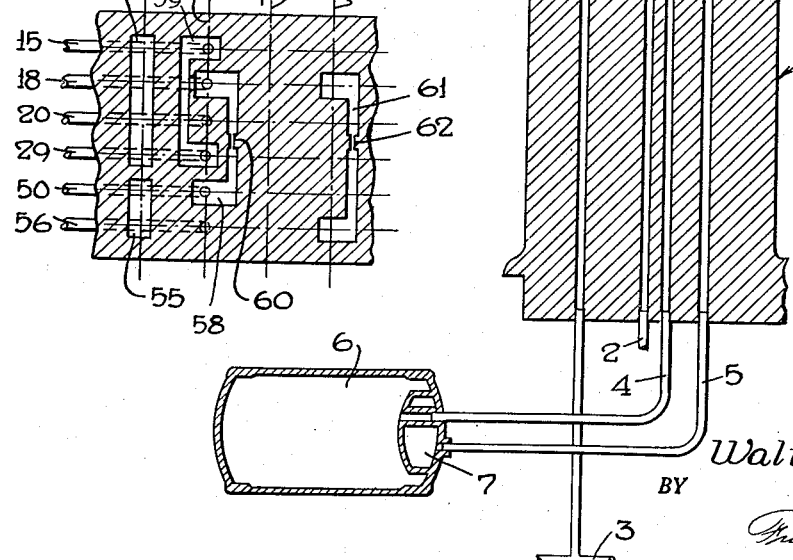

In the accompanying drawing; Fig. 1 is a diagrammatic view of a portion of a locomotive brake equipment embodying the invention; and Fig. 2 is a development, diagrammatic view of a rotary valve and seat of an engineer's brake valve device shown in Fig. 1.

*Description*

For the purpose of illustration, the invention is shown in the drawing associated with an engineer's automatic brake valve device of the well-known Westinghouse Air Brake Company's No. 8ET locomotive brake equipment, said brake valve device being generally like that disclosed in Patent 2,038,168 issued to C. C. Farmer on April 21, 1936, in view of which the illustration has been limited to only such parts as deemed necessary to an understanding of the invention.

As shown in the drawing, the engineer's brake valve device is of the usual pedestal type comprising a base portion 1 to which are connected the usual main reservoir pipe 2, brake pipe 3 and pipes 4 and 5 leading to the usual equalizing reservoir 6 and reduction limiting reservoir 7. Mounted on the base portion 1 is a rotary valve seat portion 8 upon the upper face of which is mounted a rotary valve 9 which is contained in a chamber 10 provided in a cover section 11 mounted on the seat portion 8. The rotary valve 9 is connected by a key 12 to the usual engineer's operating handle 13 which is operable to turn said valve to the usual release, running, first service, lap, service and emergency positions all of which, except release and emergency positions, are designated by legends in Fig. 2. In Fig. 1, the rotary valve is shown in first service position.

A feed valve device 14 mounted on base 1 is adapted to receive fluid under pressure from the main reservoir pipe 2 and to reduce such pressure to that desired to be carried in brake pipe 3 and constantly supply same via passage 15 to the rotary valve chamber 10.

Associated with the rotary valve seat portion 9 is an equalizing mechanism comprising an equalizing piston 16 at one side of which is a chamber 17 open via passage 18 to the seat of rotary valve 9 and to equalizing reservoir 6. At the opposite side of piston 16 is a chamber 19 open via passage 20 to the seat of rotary valve 9 and to brake pipe 3. This piston 16 has a stem 21 depending into chamber 19 where it is connected to the end of one arm 21a of a bell crank, the other arm of which is connected to a brake pipe discharge valve 22 arranged to control communication between brake pipe chamber 19 and a passage 23. A maintaining valve 24 contained in a chamber 25 controls communication between said chamber and the brake pipe chamber 19 and has a stem 26 extending into the latter chamber for engagement by the bell crank arm 21.

When the equalizing piston 16 is in the position in which it is shown in the drawing, the discharge valve 22 and maintaining valve 24 are both adapted to be seated by springs 27 and 28, respectively. Upon movement of piston 16 upwardly from the position in which it is shown in the drawing the bell crank is adapted to operate to open the discharge valve 22 while upon downward movement from said position, said piston is adapted to open the maintaining valve 24. The maintaining valve chamber 25 is connected via passage 29 to the seat of rotary valve 9. Passage 23 from the brake pipe discharge valve 22 leads to a valve chamber 30 in the cover section 11. Chamber 30 contains a valve 34 controlling communication between said chamber and an atmospheric passage 35 and said valve is adapted to be opened by a cam 36 on handle 13 when in first service, service and lap positions and closed in all other positions of said handle by a spring 57. At the juncture of cover portion 11 with rotary valve seat portion 8, a preliminary exhaust choke 37 is disposed in passage 23 to control rate of flow of fluid under pressure in the direction to valve chamber 30.

According to the invention, I associate with the brake valve device an automatic fading and flat maintaining selector valve device 38. The device 38 comprises a casing containing a movable abutment which may be in the form of a piston 39 at one side of which is a chamber 40 open through a pipe 41 to passage 23 at a point therein between the brake pipe discharge valve 22 and preliminary exhaust choke 37. At the opposite side of piston 39 is a chamber 42 open to atmosphere through a passage 43 and containing a bias spring 44 urging said piston to the position in which it is shown in the drawing. The piston 39 has a stem 45 extending through chamber 42 and a bore in a partition wall 46 (in sliding contact with the wall of said bore) into a chamber 47 which is constantly open via a fading maintaining choke 48 and a pipe 49 to a passage 50 in the brake valve device. Passage 50 is connected to the seat of rotary valve 9 and via pipe 5 to the reduction limiting reservoir 7. Chamber 47 contains a check valve 51 arranged to be moved by stem 45 into engagement with a seat 52 to close communication between chamber 47 and a passage 53 leading to atmosphere. A light bias spring 54 acts on check valve 51 to urge it out of contact with seat 52.

In running position (Fig. 2) of rotary valve 9 a cavity 54 is adapted to connect the rotary valve chamber 10 and feed valve passage 15 to the equalizing reservoir passage 18 and the brake pipe passage 20, whereby the equalizing reservoir 6 and brake pipe 3, and thereby chambers 17 and 19 at opposite sides of the equalizing piston 16 will become charged with fluid at the pressure supplied by the feed valve device 14 and which it is desired to normally carry in the brake pipe 3. With the pressures acting on opposite sides of the equalizing piston 16 thus the same the brake pipe discharge valve 22 and maintaining valve 24 will both be seated by the respective springs 27, 28. Also in running position of the rotary valve 11 a cavity 55 therein will open the reduction limiting reservoir 7 to an atmospheric port 56.

With the brake equipment thus full charged with fluid under pressure if it is desired to effect a light slack gathering application of brakes on a train, the brake valve handle 13 will be operated to open the valve 34 and to turn the rotary valve 9 to first service position. In this position the brake pipe 3 and equalizing reservoir 6 are disconnected from the rotary valve chamber 10 to terminate supply of fluid under pressure thereto, the brake pipe passage 20 being lapped by said valve, while a passage 58 in said valve opens the equalizing reservoir passage 18 to the reduction limiting reservoir passage 50 and another passage 59 in said valve opens the rotary valve chamber 10 to passage 29 and thence the maintaining valve chamber 25.

Upon opening the equalizing reservoir passage 18 to the reduction limiting reservoir passage 50, fluid under pressure will flow from the equalizing reservoir 6 to the reduction limiting reservoir 7 at a service rate, controlled by a service choke 60 in passage 58, resulting in a service rate of reduction in pressure in equalizing piston chamber 17 until the pressure in the two reservoirs substantially equalize after which the pressure in the equalizing reservoir 6 and thereby piston chamber 17 will continue to reduce at a much slower rate by flow from passage 50 through the fading maintaining choke 48 to chamber 47 in the maintaining selector valve 38 and thence to atmosphere past valve 51 which will be open at this time for reasons which will be later brought out.

When the equalizing reservoir pressure in chamber 17 is reduced as just mentioned, if such reduction reduces such pressure below brake pipe pressure in chamber 19 the piston 16 will rise and operate the bell crank to open the discharge valve 22 whereupon fluid under pressure will be vented from the brake pipe 3 to passage 23 and thence through the preliminary exhaust choke 37 and past the open valve 34 to atmosphere in the usual manner. Due to choke 37 the pressure in passage 23 will promptly build up substantially to that in the brake pipe 3 and become effective through pipe 41 in piston chamber 40 of the maintaining selector device 38. The pressure in chamber 40 acting on one side of piston 39 will thus promptly increase to a degree sufficient to overcome the opposing force of bias spring 44 whereupon said piston will move against said spring and operate stem 45 to seat the check valve 51. The seating of check valve 51 will occur promptly following opening of the discharge valve 51 and, it will be noted, that it closes the fluid pressure release communication, including the fading maintaining choke 48, from the reduction limiting reservoir 7 so as to prevent further reducing of pressure of fluid in the equalizing reservoir 6 via said choke for thereby limiting the reduction in equalizing reservoir pressure to substantial equalization into the reduction limiting reservoir 7. After the brake pipe pressure becomes reduced by flow through the exhaust choke 37 to a degree equal substantially to reduced equalizing reservoir pressure in chamber 17, the equalizing piston 16 will be returned to normal position and the discharge valve 22 will become seated to prevent further venting of fluid under pressure from the brake pipe.

In case there is leakage of fluid under pressure from the brake pipe 3, the brake pipe pressure in chamber 19 will then reduce below the bottled up equalizing reservoir pressure in chamber 17 and when thus reduced slightly, the piston 16 will move down and open the maintaining valve 24 to supply fluid under pressure to the brake pipe in an amount sufficient to compensate for such leakage. The pressure of fluid in the brake pipe will thereby be held constant and equal substantially to the reduced pressure in the equalizing reservoir 6 acting in piston chamber 17, this being known as flat maintaining. In this manner the brakes on a connected train will be applied in accordance with the reduction in pressure in the equalizing reservoir 6 and leakage of fluid under pressure from the brake pipe will be prevented from undesirably increasing the degree of such application.

Now let it be assumed that when the brake valve device is moved to first service position that a false gradient is present in the brake pipe of a connected train due to which the pressure in brake pipe 3 at the locomotive in tending to equalize with that at the rear of the train will reduce at a faster rate than the service rate of reduction in pressure in equalizing reservoir 6. Now when the brake pipe pressure in piston chamber 19 becomes slightly reduced below the reducing equalizing reservoir pressure in chamber 17, the equalizing piston 16 will be moved downward and open the maintaining valve 24 an amount which will supply sufficient fluid under pressure to the brake pipe 3 to hold the pressure therein equal substantially to the reducing pressure of fluid in the equalizing reservoir 6. The pressure in the brake pipe 3 will thus be permitted to reduce along with the service rate of reduction in pressure in the equalizing reservoir 6 and then at the slower rate controlled by the fading choke 48, it being noted that the check valve 51 is still open since the brake pipe discharge valve 22 has not yet been unseated. By continuing the reduction in pressure in the equalizing reservoir 6 and brake pipe at the slow rate controlled by the fading choke 48, the amount of fluid under pressure supplied to the brake pipe by the maintaining valve 24 will be insufficient to increase brake pipe pressure back in the train substantially above that to which it was reduced by quick service operation of the AB valves in the train, whereby operation of said AB valves to release the brake application will be prevented, as desired. As soon as the false gradient in the brake pipe disappears, however, the pressure in the brake pipe at the locomotive will cease dropping faster than the pressure in the equalizing reservoir 6 is reducing, whereupon equalizing piston 16 will operate to open the brake pipe discharge 22 to continue the reduction in brake pipe pressure according to the reduction in pressure in the equalizing reservoir 6, it being noted that upon opening of the discharge valve 22, the piston 39 will be caused to operate to seat the check valve 51 for terminating fading maintaining. Thus in case of a false gradient, fading maintaining will be effective only until the false gradient disappears and the possibility of undesired release of brakes is past.

When pressure of fluid in the brake pipe 3 becomes finally reduced to a degree equal substantially to the reduced pressure in the equalizing reservoir 6, the discharge valve 22 will seat, but if there is leakage of fluid under pressure from the brake pipe the maintaining valve 24 will be opened to supply fluid under pressure to the brake pipe to hold, on the flat maintaining principle, the pressure therein equal to reduced equalizing reservoir pressure. Upon closing of the discharge valve 22, pressure of fluid in piston chamber 40 of the selector valve device 38 will be dissipated through pipe 41, passage 23 and past the open valve 34. The piston 39 will then be returned to normal position by a spring 44 but the check valve 51 will remain seated by pressure of fluid in the reduction limiting reservoir 5, so as to prevent further reduction in pressure in the equalizing reservoir 6 in first service position of the brake valve device.

After an application of brakes has been initiated by use of first service position, as above described, if it is desired to increase the degree of application, the brake valve handle 13 and rotary valve 9 may be turned to service position in which the equalizing reservoir passage 18 is opened to the atmospheric exhaust passage 56 via passage 61 in the rotary valve 9 whereupon the pressure of fluid in the equalizing reservoir 6 and piston chamber 17 will be further reduced at a service rate controlled by a service choke 62 to cause operation of the equalizing mechanism to open the discharge valve 22 to effect a corresponding reduction in pressure in brake pipe 3 and thereby a corresponding increase in the degree of brake application in a train.

After a brake application has been thus increased to a desired degree, the brake valve handle 13 and rotary valve 9 may be turned to the usual lap position for bottling up the fluid under pressure remaining in the equalizing reservoir 6 and then the discharge valve 22 will seat when brake pipe pressure becomes reduced to a degree equal substantially to that in the equalizing reservoir.

If a train is descending a grade or if at any other time it is desired to compensate for brake pipe leakage after having applied the brakes so as to prevent leakage from undesirably increasing the degree of brake application, then the brake valve handle 13 and rotary valve 9 may be turned from service position back to first service position instead of stopping in lap position. In the first service position the maintaining valve chamber 25 is opened to the rotary valve chamber (as is not the case in either service or lap position), whereby, as before described, the brake pipe pressure will be maintained against leakage at the desired reduced pressure.

It will be noted that the reduction limiting reservoir 7 may be charged with fluid at a pressure in excess of that in the equalizing reservoir 6 at the time the brake valve device is moved from service to first service position and result in increasing pressure of fluid in the equalizing reservoir. The amount of such increase will however be negligible from a practical standpoint since the equalizing reservoir is perhaps ten times the volume of the reduction limiting reservoir.

When it is desired to release the brakes, the brake valve handle 13 and rotary valve 9 will be returned to running position in which the equalizing reservoir 6 and brake pipe will be recharged with fluid at the pressure provided by the feed valve device 14 resulting in release of an application of brakes. Also in running position of the brake valve device the reduction limiting reservoir 7 will be vented via cavity 55 in the rotary valve and exhaust passage 56, chamber 47 in the selector valve device 38 being vented at the same time. When the pressure in chamber 47 is thus reduced sufficiently spring 54 will open check valve 51 so that the fading choke 48 may be effective if necessary in initiating another application of brakes. It will be noted that once the check valve 51 is seated to cut out fading maintaining in effecting an application of brakes it will remain seated to provide flat maintaining, if such is desired, until subsequent release of the application of brakes.

*Summary*

It will now be seen that I have provided means for automatically providing fading maintenance of brake pipe pressure whenever such is necessary to prevent release of a brake application upon initiating such an application when a false gradient is present in the brake pipe, and to provide at all other times flat maintaining as is particularly desirable for handling of a train down a grade.

Having now described my invention, what I claim as new and desire to secure by Letters Patent, is:

1. In combination, a normally charged brake pipe, a normally charged equalizing reservoir, a normally vented reduction limiting reservoir, a discharge valve for venting fluid under pressure from said brake pipe, a maintaining valve for supplying fluid under pressure to said brake pipe, an equalizing piston subject to pressure of fluid in said equalizing reservoir acting in opposition to pressure of fluid in said brake pipe and operative upon a reduction in equalizing reservoir pressure, if equalizing reservoir pressure reduces below that in said brake pipe, to open said discharge valve and if brake pipe pressure reduces below that in said equalizing reservoir to open said maintaining valve, a restricted communication for releasing fluid under pressure from said reduction limiting reservoir, valve means operable by fluid under pressure to close said communication, means for conveying fluid under pressure, vented by said discharge valve, to said valve means to actuate same and an engineer's brake valve rotary valve movable to a position to establish communication between said reservoirs.

2. In combination, a normally charged brake pipe, a normally charged equalizing reservoir, a normally vented reduction limiting reservoir, a discharge valve for venting fluid under pressure from said brake pipe, a mantaining valve for supplying fluid under pressure to said brake pipe, an equalizing piston subject to pressure of fluid in said equalizing reservoir acting in opposition to pressure of fluid in said brake pipe and operative upon a reduction in equalizing reservoir pressure, if equalizing reservoir pressure reduces below that in said brake pipe, to open said discharge valve and if brake pipe pressure reduces below that in said equalizing reservoir to open said maintaining valve, a restricted communication for releasing fluid under pressure from said reduction limiting reservoir, a check valve in said communication having an open position for opening said communication and a closed position for closing said communication and subject in said closed position to pressure of fluid in said reduction limiting reservoir for holding same in said closed position, means controlled by and operative upon opening said discharge valve to move said check valve to said closed position, an engineer's brake valve rotary valve having one position for opening a communication for releasing fluid under pressure from said reduction limiting reservoir and another position for closing the last named communication and for opening said equalizing reservoir to said reduction limiting reservoir, and spring means operative upon release of fluid under pressure from said reduction limiting reservoir by said rotary valve to move said check valve to said open position.

3. In combination, a normally charged brake pipe, a normally charged equalizing reservoir, a normally vented reduction limiting reservoir, a discharge valve for venting fluid under pressure from said brake pipe, a maintaining valve for supplying fluid under pressure to said brake pipe, an equalizing piston subject to pressure of fluid in said equalizing reservoir acting in opposition to pressure of fluid in said brake pipe and operative upon a reduction in equalizing pressure, if equalizing reservoir pressure reduces below that in said brake pipe, to open said discharge valve and if brake pipe pressure reduces below that in said equalizing reservoir to open said maintaining valve, a restricted communication for releasing fluid under pressure from said reduction limiting reservoir, a check valve for closing said communication, a piston operative by fluid under pressure for operating said check valve to close said communication, means for conveying fluid under pressure vented by said discharge valve to the last named piston for operating same, said check valve upon closing said communication being operative by fluid under pressure in said reduction limiting reservoir to hold said communication closed, means for operating said check valve to open said communication upon release of fluid under pressure from said reduction limiting reservoir, a second communication for releasing fluid under pressure from said reduction limiting reservoir, and a brake valve rotary valve having one position for opening said second communication and another position for closing said second communication and for opening said reduction limiting rservoir to said equalizing reservoir.

4. In combination, a brake pipe, an equalizing reservoir, a reduction limiting reservoir, a discharge valve for venting fluid under pressure from said brake pipe, a maintaining valve for supplying fluid under pressure to said brake pipe, an equalizing piston subject to opposing pressures in said equalizing reservoir and brake pipe and operative upon a reduction in equalizing reservoir pressure, when equalizing reservoir pressure becomes lower than brake pipe pressure, to open said discharge valve and if brake pipe pressure becomes lower than equalizing reservoir pressure to open said maintaining valve, an engineer's brake valve device having one position for supplying fluid under pressure to said brake pipe and equalizing reservoir and for venting said reduction limiting reservoir, a first service position for cutting off supply of fluid under pressure to said brake pipe and for opening said equalizing reservoir to said reduction limiting reservoir, and another service position for opening said equalizing reservoir directly to atmosphere, a restricted communication for releasing fluid under pressure from said reduction limiting reservoir, means controlled by and operative in response to operation of said discharge valve to vent fluid under pressure from said brake pipe, to close said communication, and means for opening said communication only upon release of fluid under pressure from said reduction limiting reservoir.

5. In combination, a brake pipe, an equalizing reservoir, a reduction limiting reservoir, a discharge valve for venting fluid under pressure from said brake pipe, a maintaining valve for supplying fluid under pressure to said brake pipe, an equalizing piston subject to opposing pressures in said equalizing reservoir and brake pipe and operative upon a reduction in equalizing reservoir pressure, when equalizing reservoir pressure becomes lower than brake pipe pressure, to open said discharge valve and if brake pipe pressure becomes lower than equalizing reservoir pressure to open said maintaining valve, an engineer's brake valve device having one position for supplying fluid under pressure to said brake pipe and equalizing reservoir and for venting said reduction limiting reservoir, a first service position for cutting off supply of fluid under pressure to said brake pipe and for opening said equalizing reservoir to said reduction limiting reservoir, and another service position for opening said equalizing reservoir directly to atmosphere, a communication for releasing fluid under pressure from said reduction limiting reservoir, a fading maintaining choke in said communication, valve means having open and closed positions for respectively opening and closing said communication, a movable abutment operative by fluid under pressure vented from said brake pipe by said discharge valve to operate said valve means to its closed position in which it is adapted to be held by pressure of fluid in said reduction limiting reservoir, and means for moving said valve means to its open position upon release of fluid under pressure from said reduction limiting reservoir.

References Cited in the file of this patent
UNITED STATES PATENTS

| Number | Name | Date |
|---|---|---|
| 2,038,168 | Farmer | Apr. 21, 1936 |
| 2,055,105 | Hewitt | Sept. 22, 1936 |